(12) United States Patent
Woodman, Jr.

(10) Patent No.: US 11,507,762 B2
(45) Date of Patent: Nov. 22, 2022

(54) PAYMENT TERMINAL EVALUATOR

(71) Applicant: Target Brands, Inc., Minneapolis, MN (US)

(72) Inventor: Terrence Arnold Woodman, Jr., Cottage Grove, MN (US)

(73) Assignee: Target Brands, Inc., Minneapolis, MN (US)

( * ) Notice: Subject to any disclaimer, the term of this patent is extended or adjusted under 35 U.S.C. 154(b) by 266 days.

(21) Appl. No.: 17/083,619

(22) Filed: Oct. 29, 2020

(65) Prior Publication Data

US 2022/0138443 A1    May 5, 2022

(51) Int. Cl.
*G06K 7/00* (2006.01)

(52) U.S. Cl.
CPC ......... *G06K 7/0091* (2013.01); *G06K 7/0021* (2013.01)

(58) Field of Classification Search
CPC ........................... G06K 7/0091; G06K 7/0021
See application file for complete search history.

(56) References Cited

U.S. PATENT DOCUMENTS

| | | | |
|---|---|---|---|
| 5,979,771 A * | 11/1999 | Adams | G06K 7/0021 235/441 |
| 8,550,362 B2 | 10/2013 | Cowcher | |
| 8,973,825 B2 | 3/2015 | Tudor et al. | |
| 9,818,049 B2 | 11/2017 | Goedee et al. | |
| 10,360,416 B1 * | 7/2019 | Dant | G06K 7/0056 |
| 10,373,417 B1 | 8/2019 | Faoro et al. | |
| 10,410,022 B2 * | 9/2019 | Akahane | G06K 7/10 |
| 10,496,914 B2 | 12/2019 | Scaife et al. | |
| 10,497,199 B2 * | 12/2019 | MacKinnon | G07F 9/02 |

FOREIGN PATENT DOCUMENTS

| | | |
|---|---|---|
| DE | 20201110556 U1 | 11/2011 |
| EP | 2897108 A1 | 7/2015 |

OTHER PUBLICATIONS

Skim Scan, https://bvsystems-com-mt957z5by.netdna-ssl.com/wp-content/uploads/2019/06/Skim-Scan.pdf, 2 pages, 2020.

* cited by examiner

*Primary Examiner* — Christle I Marshall
(74) *Attorney, Agent, or Firm* — Theodore M. Magee; Westman, Champlin & Koehler, P.A.

(57) ABSTRACT

A payment terminal evaluator includes a contact structure and a card structure. The contact structure intersects a rectangular space such that part of the contact structure is within the rectangular space and part of the contact structure is outside of the rectangular space. The card structure extends from the contact structure and is positioned entirely within the rectangular space. The card structure includes a top surface, a bottom surface, a first side surface between the top surface and the bottom surface, a second side surface between the top surface and the bottom surface, a first tab defined in part by the top surface, the bottom surface and the first side surface, a second tab defined in part by the top surface, the bottom surface and the second side surface, and an opening between the first tab and the second tab.

20 Claims, 7 Drawing Sheets

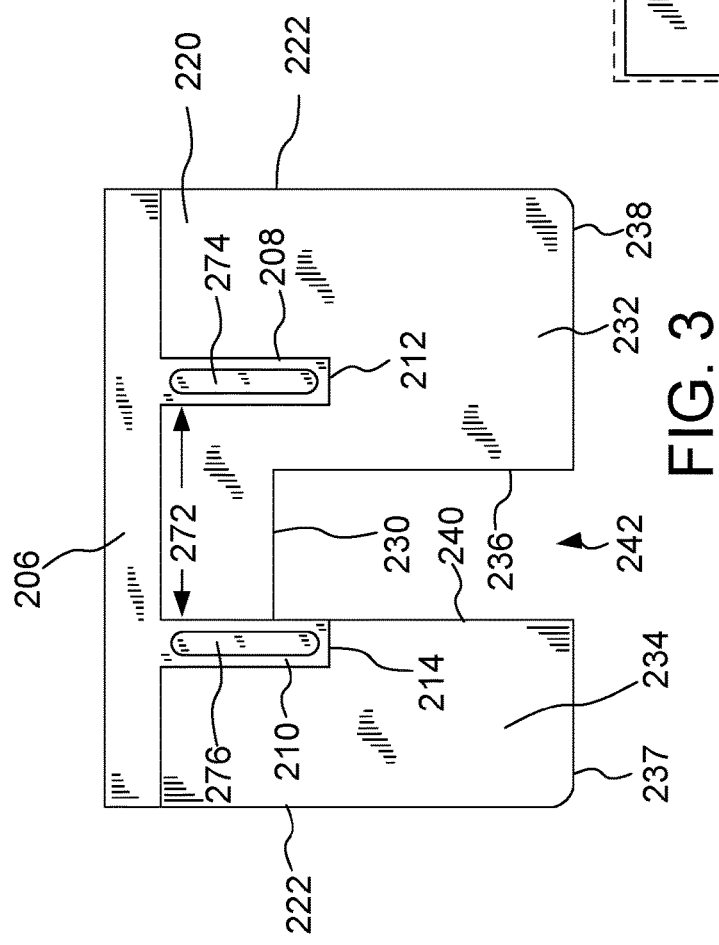
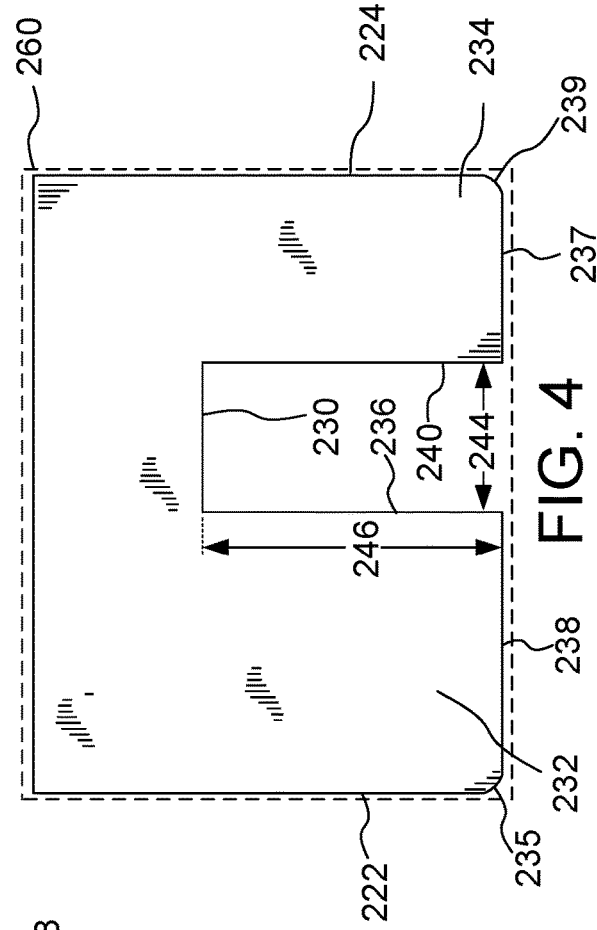

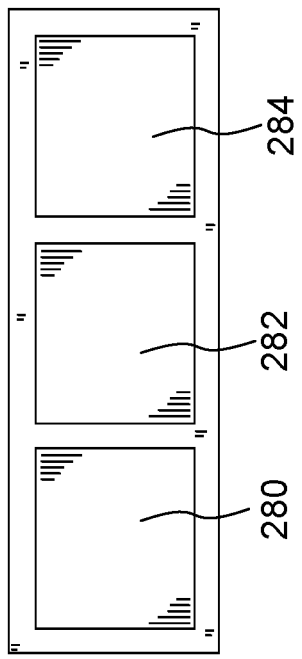
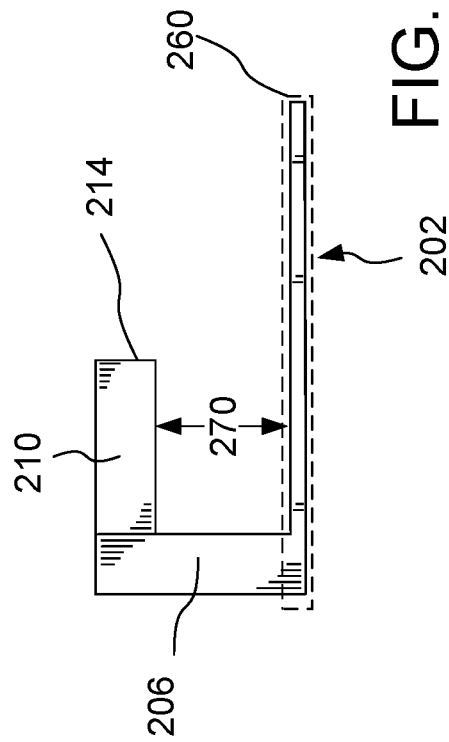
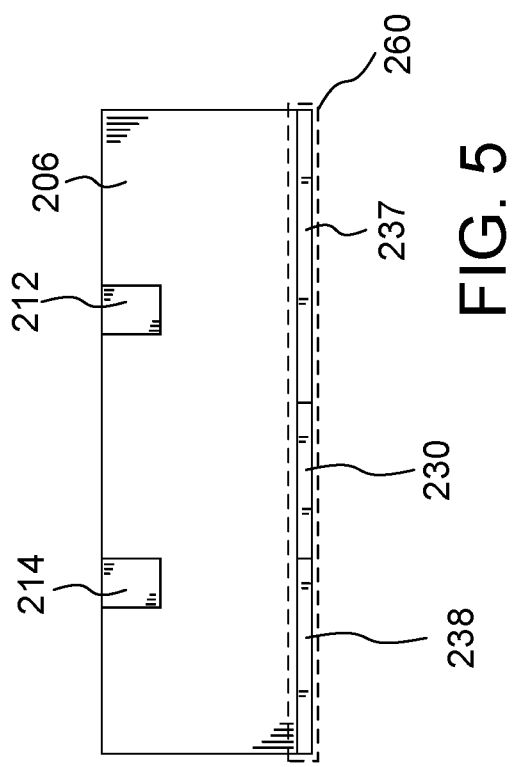
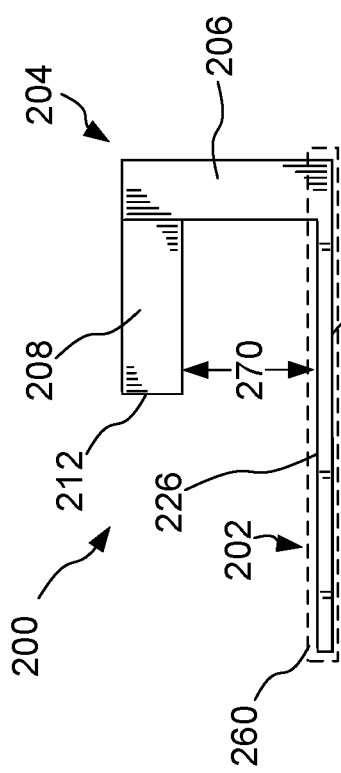

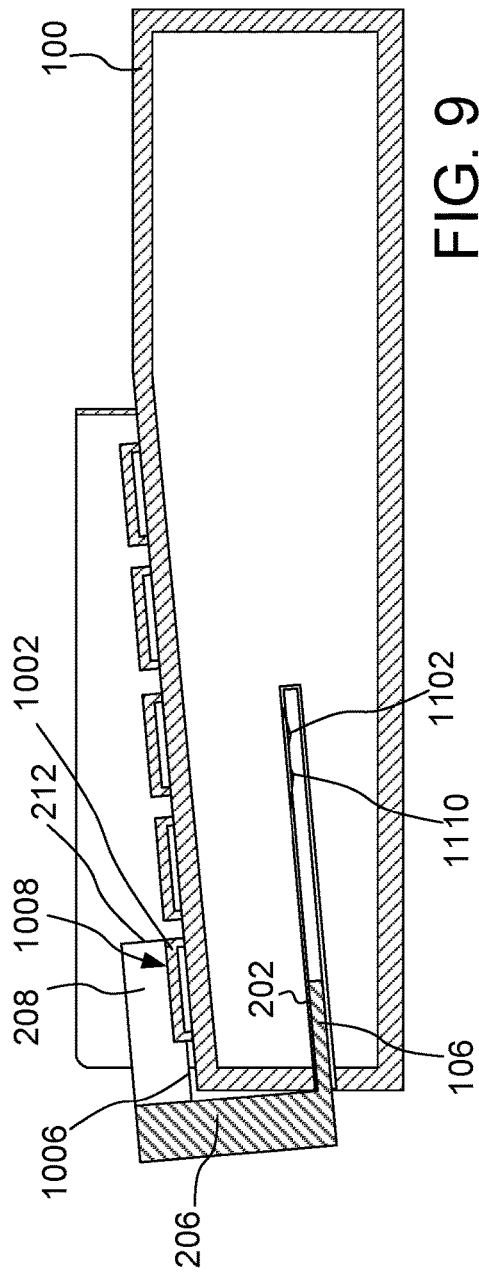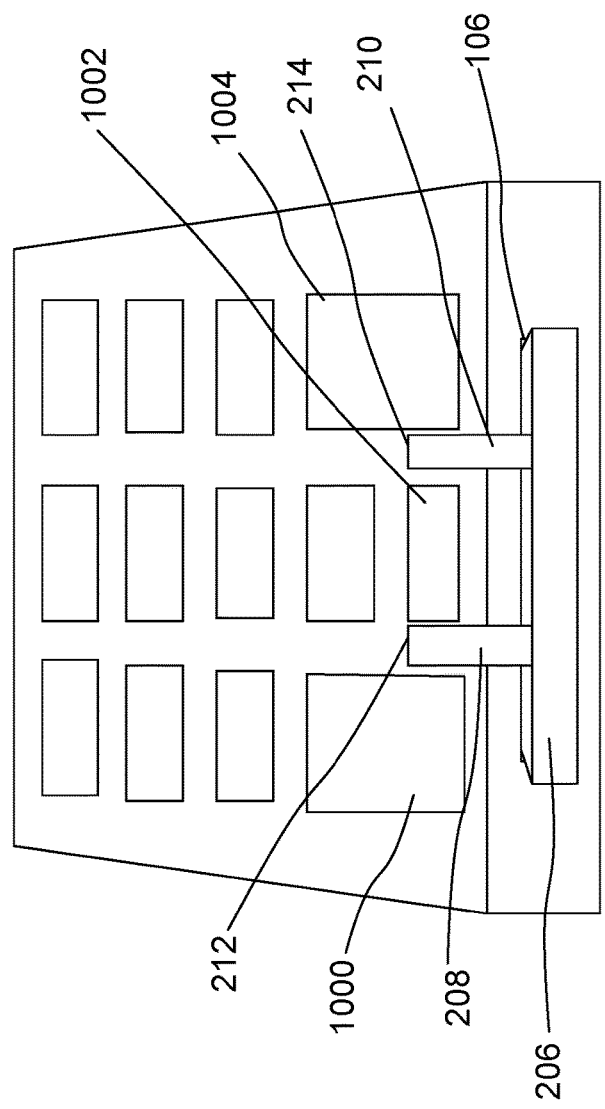

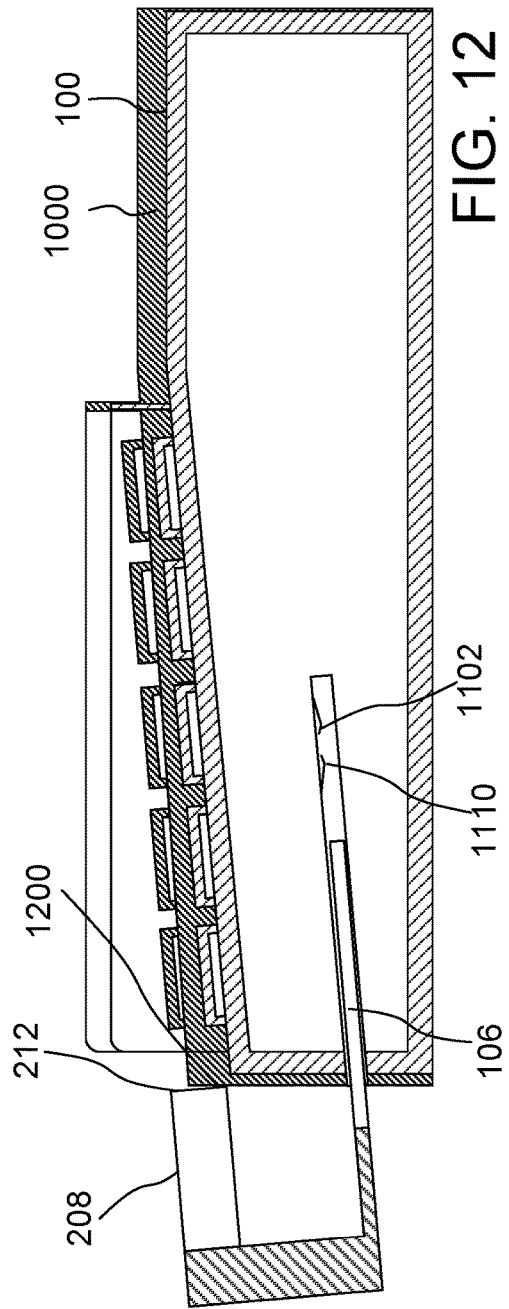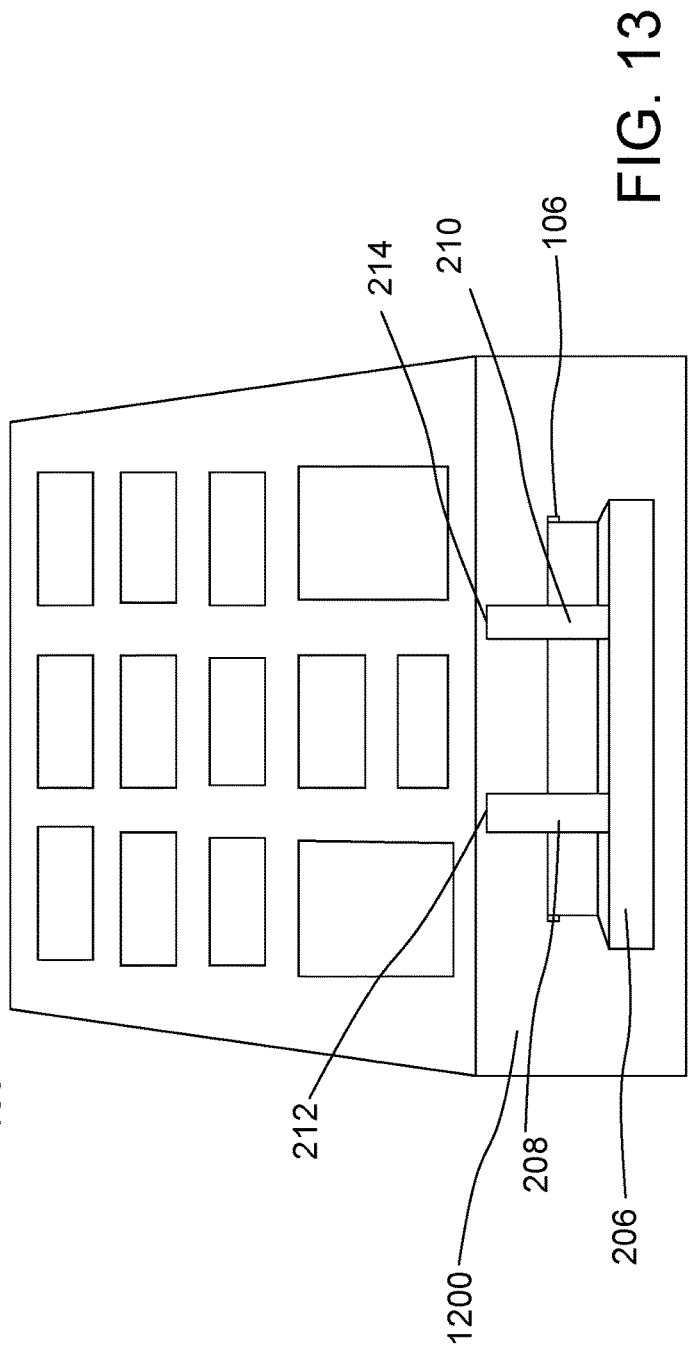

PAYMENT TERMINAL EVALUATOR

BACKGROUND

In retail environments, customers can pay for items or services using a payment card, such as a credit card or debit card. To facilitate such transactions, payment terminals are provided that read information from the payment card using a magnetic strip reader, a chip reader and/or a wireless reader, for example. Payment terminals also include a keypad that allows customers to enter a PIN for their card, authorize payment and request receipts. Such payment terminals are directly accessible by the customer such that the customer taps, inserts or swipes their card in the terminal and presses the keys of the keypad.

Criminals have developed sophisticated overlays that fit on top of a payment terminal and exactly mimic the appearance of the payment terminal such that when the overlay is in place, it is difficult to perceive the presence of the overlay. Once in place, the overlay can capture information provided on the payment card and can capture PIN numbers entered through the keypad. With the payment card information and the PIN number, criminals are able to access funds provided through the card.

The discussion above is merely provided for general background information and is not intended to be used as an aid in determining the scope of the claimed subject matter. The claimed subject matter is not limited to implementations that solve any or all disadvantages noted in the background.

SUMMARY

A payment terminal evaluator includes a contact structure and a card structure. The contact structure intersects a rectangular space such that part of the contact structure is within the rectangular space and part of the contact structure is outside of the rectangular space. The card structure extends from the contact structure and is positioned entirely within the rectangular space. The card structure includes a top surface, a bottom surface, a first side surface between the top surface and the bottom surface, a second side surface between the top surface and the bottom surface, a first tab defined in part by the top surface, the bottom surface and the first side surface, a second tab defined in part by the top surface, the bottom surface and the second side surface, and an opening between the first tab and the second tab.

In accordance with a further embodiment, a method of evaluating payment terminals includes inserting a first portion of a structure into a chip-reading slot of a payment terminal while keeping the first portion from contacting electrical contacts within the chip-reading slot. The payment terminal is determined to be fraudulent when a second portion of the structure contacts the payment terminal.

In accordance with a still further embodiment, a method includes inserting a card structure having a gap into a chip-reading slot of a payment terminal such that the gap is aligned with electrical contacts within the chip-reading slot. The payment terminal is determined to not be fraudulent when a free end of a contact structure extending from the card structure fails to contact the payment terminal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a top view of the payment terminal evaluator of FIG. 2.

FIG. 4 is a bottom view of the payment terminal evaluator of FIG. 2

FIG. 5 is a front view of the payment terminal evaluator of FIG. 2.

FIG. 6 is a back view of the payment terminal evaluator of FIG. 2.

FIG. 7 is a left side view of the payment terminal evaluator of FIG. 2.

FIG. 8 is a right side view of the payment terminal evaluator of FIG. 2

FIG. 9 is a side sectional view of a payment terminal with the payment terminal evaluator placed in the chip reading slot.

FIG. 10 is a top view of the payment terminal and payment terminal evaluator of FIG. 9.

FIG. 12 is a sectional view of the payment terminal with an overlay on top of the payment terminal and the payment terminal evaluator in the chip reading slot.

FIG. 13 is a top view of the payment terminal, overlay and payment terminal evaluator of FIG. 12.

DETAILED DESCRIPTION

In the embodiments described below, a device is provided that can be used to evaluate whether a payment terminal has an overlay placed over it while protecting electrical contacts found within the payment terminal. To determine if an overlay is present, a card structure of the payment terminal evaluator is inserted into a chip reading slot of the payment terminal. If a free end of the evaluator fails to contact the payment terminal during this insertion, the payment terminal does not have an overlay placed over it. If the free end does come into contact with something during the insertion, an overlay is present. The card structure of the evaluator includes a gap or opening that avoids making contact with electrical contacts found within the chip reading slot thereby preventing the evaluator from damaging the contacts within the payment terminal.

Figure 1:
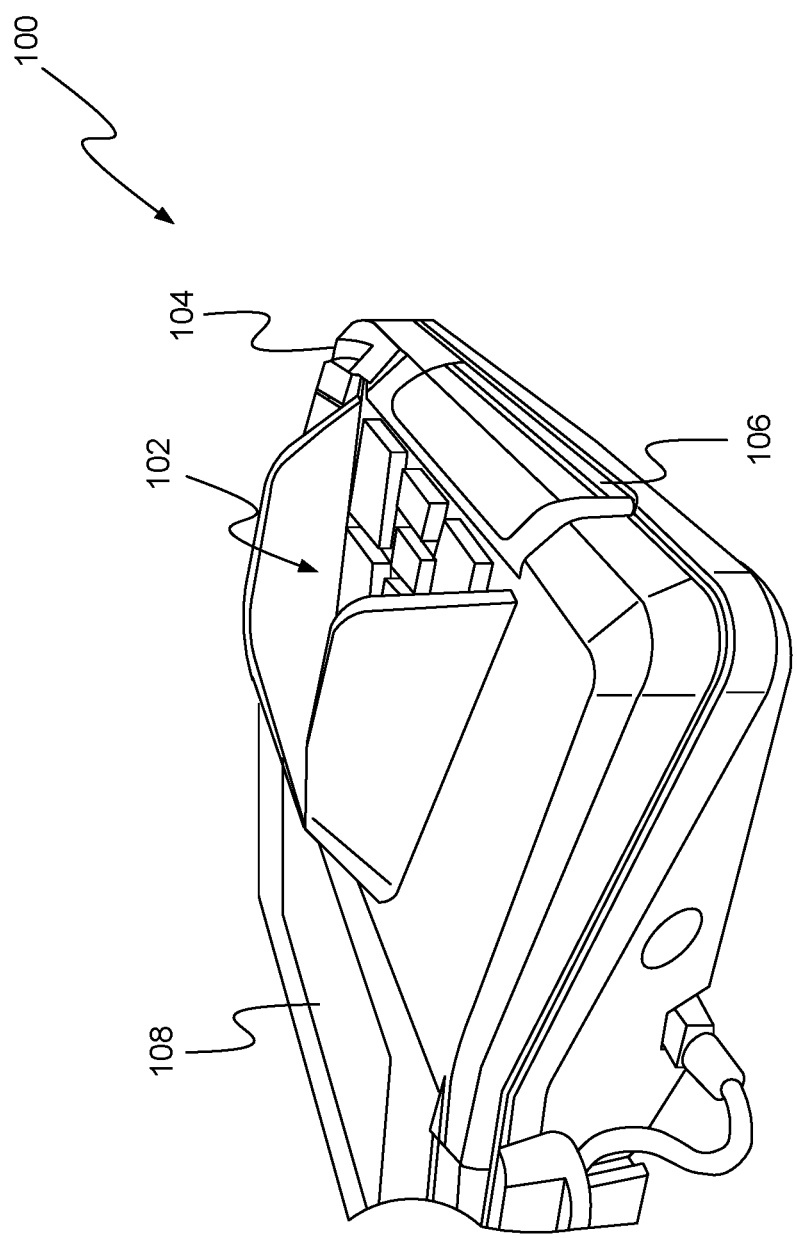
FIG. 1 is a perspective view of a payment terminal of the prior art.
Figure 2:
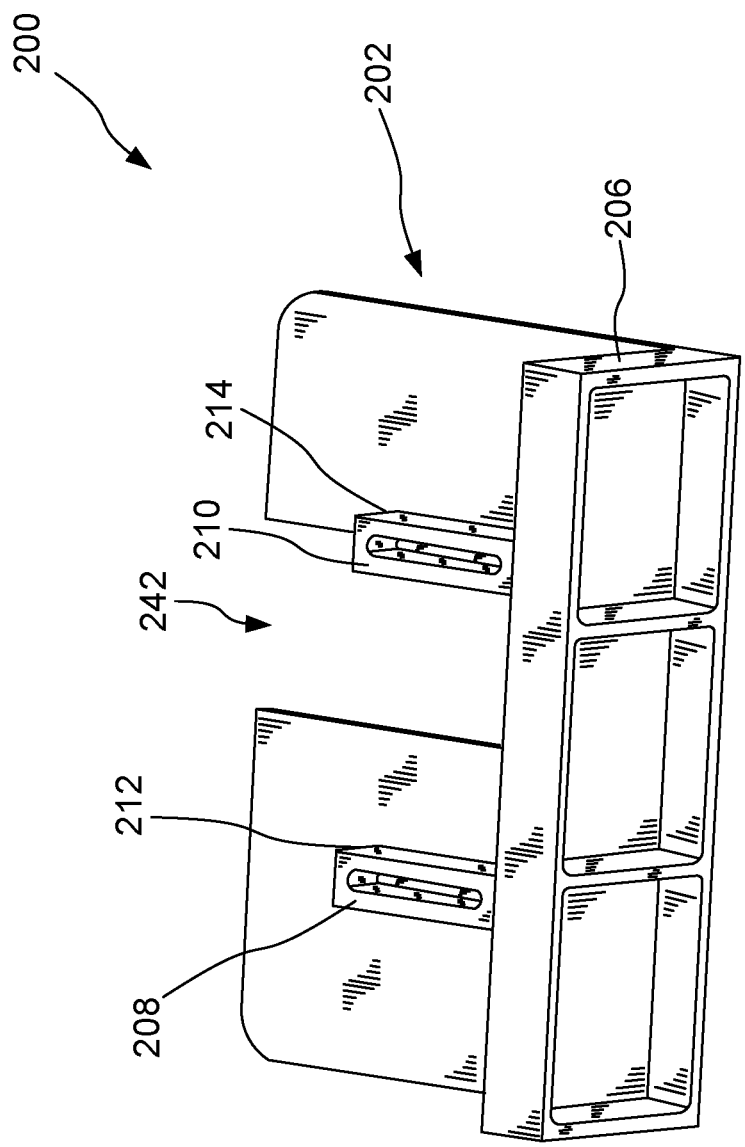
FIG. 2 is a perspective view of payment terminal evaluator in accordance with one embodiment.

FIG. 1 provides a perspective view of a payment terminal 100 in accordance with the prior art. Payment terminal 100 includes keypad 102, magnetic strip swipe channel 104, chip reading slot 106 and display 108. Chip reading slot 106 is sized to accept a payment card such as a credit card or debit card and includes a set of electrical contacts that can make contact with a chip that is embedded within the payment card. Through these electrical contacts, payment terminal 100 is able to interrogate the chip on the card to retrieve encoded information from the card so as to ensure that the card is authentic.

FIGS. 2-8 provide a back/top perspective view, a top view, a bottom view, a front view, a back view, a left side view and a side right view, respectively, of a payment terminal evaluator 200 of the various embodiments. Evaluator 200 includes a card structure 202 that is shaped to fit within chip reading slot 106 of payment terminal 100 and a contact structure 204 consisting of a vertical component 206 and two lateral components 208 and 210, which in one embodiment take the form of two arms. Lateral components 208 and 210 include respective free ends 212 and 214.

In order to prevent damage to electrical contacts within chip reading slot 106, card structure 202 is constructed to provide an opening or gap 242 that aligns with the contacts when card structure 202 is inserted into chip reading slot 106. In particular, card structure 202 includes a base 220 that extends from vertical component 206 and, as shown in FIGS. 3 and 7, is defined by a first side surface 222, second side surface 224, a top surface 226 and a bottom surface 228 and a recessed front surface 230. First side surface 222, second side surface 224 and recessed front surface 230 all extend between top surface 226 and bottom surface 228. A first tab 232 and a second tab 234 extend from base 220 away from vertical component 206 with first tab 232 being defined by top surface 226 and bottom surface 228, first side surface 222, a front surface 238 and a first inner surface 236. Front surface 238 and first inner surface 236 both extend between top surface 226 and bottom surface 228. First side surface 222 extends from base 220 along first tab 232 and intersects with front surface 238 along a curve 235. Front surface 238 intersects with inner surface 236, which intersects with recess surface 230 of base 220. Although the intersections of inner surface 236 with front surface 238 and recess surface 230 are shown as right angles in FIG. 3, in other embodiments, the surfaces may intersect along a curved surface.

Second tab 234 is defined by side surface 224, a front surface 237, a second inner surface 240, top surface 226 and bottom surface 228. Front surface 237 and second inner surface 240 extend between top surface 226 and bottom surface 228. Side surface 224 extends from base 220 and intersects with front surface 237 along a curved surface 239. Front surface 237 intersects with second inner surface 240, which also intersects with recess surface 230 of base 220. Although front surface 238 and recess surface 230 are shown to intersect with inner surface 240 at right angles, in other embodiments, the surfaces intersect through a respective curved surface.

Inner surfaces 236 and 240 and recess surface 230 define gap 242 so that gap 242 has a width 244 between inner surfaces 236 and 240, and a depth 246 that is measured between front surface 238 and recess surface 230.

As shown in FIGS. 4, 5 and 7, card structure 202 is shaped such that the entirety of card structure 202 is capable of fitting within a rectangular space 260. A portion but not all of contact structure 204 extends within rectangular space 260. In particular, a bottom of vertical structure 206 fits within rectangular space 260 and card structure 202 extends from the portion of contact structure 204 that is within rectangular space 260.

Lateral components 208 and 210 extend from the top of vertical component 206 in the same direction that card structure 202 extends from vertical component 206. As a result, lateral components 208 and 210 are above card structure 202 and are separated from card structure 202 by a height 270. As shown in FIG. 3, lateral structures 208 and 210 are separated from each other by a distance 272.

In order to provide uniform wall thickness and avoid warping of evaluator 200 when the evaluator is made from plastic, wells 274 and 276 are provided in lateral components 208 and 210, respectively. In addition, recesses 280, 282 and 284 are provided in the back of vertical component 206.

FIG. 9 provides a side sectional view and FIG. 10 provides a top view of evaluator 200 inserted into payment terminal 100. In particular, card structure 202 of evaluator 200 has been fully inserted into chip reading slot 106 to the fullest extent possible where the extent to which card structure 202 can be inserted into chip reading slot 106 is limited by contact between vertical component 206 and the exterior of payment terminal 100. As shown in FIGS. 9 and 10, with card structure 202 inserted to the fullest extent possible, free end 212 of arm 208 and free end 214 of arm 210 do not contact payment terminal 100. In other words, free ends 212 and 214 have both failed to contact payment terminal 100 when card structure 202 has been inserted as far as possible into chip reading slot 106.

As shown in FIG. 10, arm 208 is positioned such that it fits between keys 1000 and 1002 without free end 212 contacting either key and arm 210 is positioned such that it fits between keys 1002 and 1004 without free end 214 contacting either key. As shown in the embodiment of FIG. 9, height 270 between card structure 202 and arms 208 and 210 is such that a bottom surface 1006 of arm 208 is below a top surface 1008 of key 1002. Similarly, bottom surface 1006 of arm 208 is below a top surface of key 1000 and a bottom surface of arm 210 is below top surface 1008 of key 1002 and a top surface of key 1004. This allows height 270 to be smaller than would be required if the bottom surfaces of arms 208 and 210 had to clear the top surfaces of the key. Using a smaller height 270 increases the likelihood that evaluator 200 will be able to detect the presence of an overlay on terminal 100.

Figure 11:
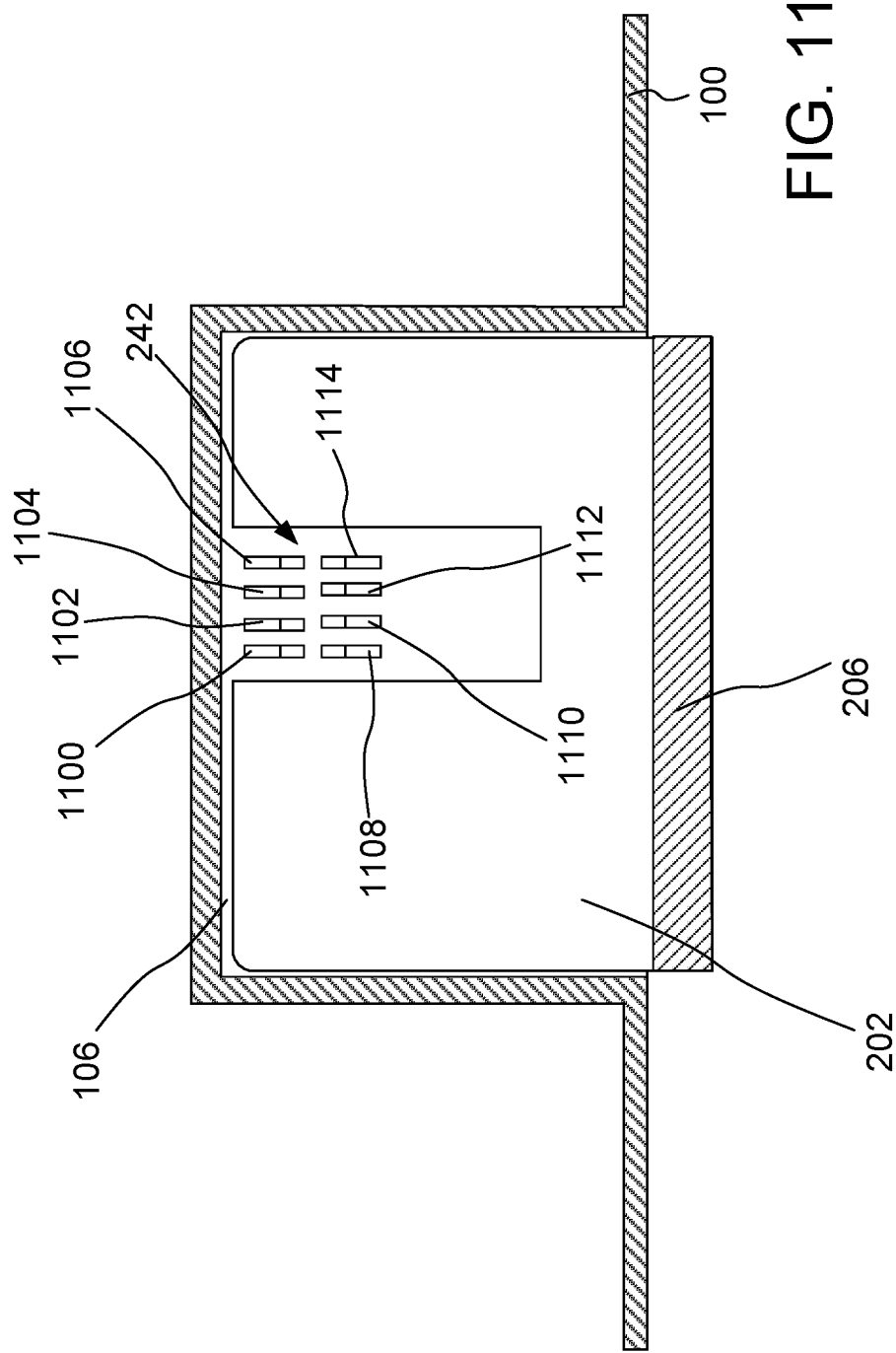
FIG. 11 is a top sectional view of the chip reading slot with the payment terminal evaluator placed therein.

FIG. 11 provides a top sectional view of card structure 202 fully inserted in chip reading slot 106. As shown in FIGS. 9 and 11, when card structure 202 is fully inserted in chip reading slot 106, opening or gap 242 is aligned with electrical contacts 1100, 1102, 1104, 1106, 1108, 1110, 1112 and 1114 of payment terminal 100 such that card structure 202 does not make contact with any of the electrical contacts of payment terminal 100. As a result, card structure 202 is prevented from damaging these electrical contacts.

FIG. 12 provides a side sectional view and FIG. 13 provides a top view of terminal 100 with an overlay 1000 over terminal 100 and evaluator 200 inserted into chip reading slot 106 to the fullest extent possible. As shown in FIGS. 12 and 13, because overlay 1000 extends above payment terminal 100, free end 212 of lateral component 208 comes into contact with a front wall 1200 of overlay 1000 thereby preventing evaluator 200 from being inserted further into chip reading slot 106. As such, evaluator 200 is not inserted as far into chip reading slot 106 as when an overlay is not present. The contact between free end 212 and overlay 1000 indicates that the combination of payment terminal 100 and overlay 1000 is fraudulent and should not be used for payment transactions. Note that in FIG. 12, card structure 202 once again does not contact any of the electrical contacts, such as electrical contacts 1110 and 1102 when overlay 1000 is present. Thus, with or without overlay 1000, card structure 202 does not come into contact with any of the electrical contacts of payment terminal 100.

Although a specific payment terminal has been shown in the embodiments described above, evaluator 200 is not limited to being used with the particular payment terminal that is shown. In addition, although a particular geometry for evaluator 200 has been shown, in other embodiments, other geometries are used. In particular, the dimensions, positions, and numbers of lateral components are changed in evaluator 200 for different payment terminals or to detect different types of overlays. In all evaluators, however, card structure 202 includes an opening or gap sufficient to avoid contact between the card structure and any electrical contacts that may be within the chip reading slot. The exact position and dimensions of the opening or gap 242 are varied depending on the location of the electrical contacts in the payment terminal that evaluator 200 is designed to work with.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A payment terminal evaluator comprising:
   a contact structure intersecting a rectangular space such that part of the contact structure is within the rectangular space and part of the contact structure is outside of the rectangular space; and
   a card structure extending from the contact structure and positioned entirely within the rectangular space, the card structure comprising:
   a top surface;
   a bottom surface;
   a first side surface between the top surface and the bottom surface;
   a second side surface between the top surface and the bottom surface;
   a first tab defined in part by the top surface, the bottom surface and the first side surface;
   a second tab defined in part by the top surface, the bottom surface and the second side surface; and
   an opening between the first tab and the second tab.

2. The payment terminal evaluator of claim 1 wherein the card structure further comprises a base extending from the contact structure wherein the base is defined by the top surface, the bottom surface, the first side surface and the second side surface and the first tab and the second tab extend from the base.

3. The payment terminal evaluator of claim 1 wherein the contact structure comprises a vertical component extending from the card structure and at least one lateral component extending from the vertical component.

4. The payment terminal evaluator of claim 3 wherein the card structure and the at least one lateral component each extend in a first direction from the vertical component.

5. The payment terminal evaluator of claim 4 wherein the at least one lateral component comprises two lateral arms.

6. The payment terminal evaluator of claim 5 wherein the two lateral arms are both at a same height above the card structure.

7. The payment terminal evaluator of claim 6 wherein the two arms are spaced apart from each other.

8. A method of evaluating payment terminals, the method comprising:
   inserting a first portion of a structure into a chip-reading slot of a payment terminal while keeping the first portion from contacting electrical contacts within the chip-reading slot; and
   determining that the payment terminal is fraudulent when a second portion of the structure contacts the payment terminal.

9. The method of claim 8 wherein inserting the first portion comprises inserting two tabs having a space defined therebetween.

10. The method of claim 9 wherein the space is aligned with the electrical contacts.

11. The method of claim 8 wherein the second portion comprises an end of an arm.

12. The method of claim 8 further comprising:
   inserting the first portion of the structure into a chip-reading slot of a second payment terminal while keeping the first portion from contacting electrical contacts within the chip-reading slot; and
   determining that the second payment terminal is not fraudulent when the second portion of the structure does not come into contact with the second payment terminal.

13. The method of claim 12 wherein inserting the first portion into the chip-reading slot of the second payment terminal comprises inserting the first portion until the first portion cannot be inserted further into the chip-reading slot.

14. The method of claim 8 wherein the payment terminal is fraudulent due to an overlay placed on the payment terminal.

15. A method comprising:
   inserting a card structure having a gap into a chip-reading slot of a payment terminal such that the gap is aligned with electrical contacts within the chip-reading slot; and
   determining that the payment terminal is not fraudulent when a free end of a contact structure extending from the card structure fails to contact the payment terminal.

16. The method of claim 15 wherein determining that the payment terminal is not fraudulent comprises determining that the card structure has been inserted as far as possible into the chip-reading slot before determining that the free end failed to contact the payment terminal.

17. The method of claim 16 wherein the card structure does not touch the electrical contacts when the card structure has been inserted as far as possible into the chip-reading slot.

18. The method of claim 15 wherein the free end of the contact structure comprises an end of an arm that extends over a portion of the card structure.

19. The method of claim 18 wherein the arm extends from a vertical portion of the contact structure and wherein the vertical portion of the contact structure is in contact with the payment terminal when the card structure has been inserted as far as possible into the chip-reading slot.

20. The method of claim 15 further comprising:
   inserting the card structure into a chip-reading slot of a second payment terminal such that the gap is aligned with electrical contacts within the chip-reading slot; and
   determining that the second payment terminal is fraudulent when the free end of the contact structure contacts an overlay on the payment terminal.

* * * * *